US007152238B1

(12) United States Patent
Leung et al.

(10) Patent No.: US 7,152,238 B1
(45) Date of Patent: Dec. 19, 2006

(54) ENABLING MOBILITY FOR POINT TO POINT PROTOCOL (PPP) USERS USING A NODE THAT DOES NOT SUPPORT MOBILITY

(75) Inventors: Kent K. Leung, Mountain View, CA (US); Gopal K. Dommety, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 880 days.

(21) Appl. No.: 09/751,944

(22) Filed: Dec. 29, 2000

(51) Int. Cl.
    *H04L 9/00* (2006.01)
(52) U.S. Cl. ......................................................... 726/2
(58) Field of Classification Search ................ 713/183, 713/170, 153; 709/250, 220; 726/2; 380/255
    See application file for complete search history.

(56) References Cited

U.S. PATENT DOCUMENTS

| 4,692,918 A | 9/1987 | Elliott et al. |
| 5,016,244 A | 5/1991 | Massey, Jr. et al. |
| 5,018,133 A | 5/1991 | Tsukakoshi et al. |
| 5,218,600 A | 6/1993 | Schenkyr et al. |

(Continued)

FOREIGN PATENT DOCUMENTS

EP          0924913 A1    6/1999

(Continued)

OTHER PUBLICATIONS

"Mobile IP Design Principles and Practices", Charles Perkins, addison wesley, 1998, pp. 50, 55-59, 83, 78.*

(Continued)

*Primary Examiner*—Jacques H. Louis-Jacques
*Assistant Examiner*—Thomas Ho
(74) *Attorney, Agent, or Firm*—Beyer Weaver & Thomas LLP

(57) ABSTRACT

Methods and apparatus for sending a registration request packet on behalf of a node that supports PPP but does not support Mobile IP is implemented in a Foreign Agent. The method comprises accepting a call from the node and receiving authentication information associated with a PPP authentication protocol from the node, the authentication information enabling a PPP node to be authenticated. From this authentication information, a PPP node profile is obtained. The PPP node profile includes registration information associated with the node that enables proxy registration to be performed by the Foreign Agent on behalf of the node, where the registration information associated with the node identifies a Home Agent associated with the node. The registration information may also include other information that may be pertinent to the composition of a registration request packet. A registration request packet including the registration information associated with the node is then composed and sent to the Home Agent on behalf of the node. The registration request packet that is sent by the Foreign Agent also may include a registration indicator indicating whether registration being performed by the Foreign Agent on behalf of the node is a re-registration by the Foreign Agent or an initial registration by the Foreign Agent. More particularly, in accordance with one embodiment, the registration request packet includes a sequence number indicating an order within a sequence of one or more registrations performed by one or more Foreign Agents on behalf of the node. From the sequence number, a Home Agent receiving the registration request packet may determine whether the Foreign Agent is performing a re-registration or an initial registration on behalf of the node.

48 Claims, 12 Drawing Sheets

U.S. PATENT DOCUMENTS

| | | | |
|---|---|---|---|
| 5,371,852 | A | 12/1994 | Attanasio et al. |
| 5,473,599 | A | 12/1995 | Li et al. |
| 5,572,528 | A | 11/1996 | Shuen |
| 5,619,552 | A | 4/1997 | Karppanen et al. |
| 5,729,537 | A | 3/1998 | Billström |
| 5,751,799 | A * | 5/1998 | Mori ..................... 379/114.09 |
| 5,805,702 | A * | 9/1998 | Curry et al. .................. 705/66 |
| 5,825,759 | A | 10/1998 | Liu |
| 5,862,345 | A | 1/1999 | Okanoue et al. |
| 5,978,672 | A | 11/1999 | Hartmaier et al. |
| 6,016,428 | A | 1/2000 | Diachina et al. |
| 6,055,236 | A | 4/2000 | Nessett et al. |
| 6,061,650 | A * | 5/2000 | Malkin et al. .............. 704/228 |
| 6,075,783 | A | 6/2000 | Voit |
| 6,078,575 | A | 6/2000 | Dommety et al. |
| 6,081,507 | A | 6/2000 | Chao et al. |
| 6,122,268 | A | 9/2000 | Okanoue et al. |
| 6,131,095 | A | 10/2000 | Low et al. |
| 6,137,791 | A | 10/2000 | Frid et al. |
| 6,144,671 | A | 11/2000 | Perinpanathan et al. |
| 6,167,513 | A * | 12/2000 | Inoue et al. ................. 713/150 |
| 6,195,705 | B1 | 2/2001 | Leung |
| 6,230,012 | B1 * | 5/2001 | Willkie et al. ........... 455/435.1 |
| 6,272,129 | B1 | 8/2001 | Dynarski et al. ........... 370/356 |
| 6,308,267 | B1 | 10/2001 | Gremmelmaier ............ 713/168 |
| 6,339,830 | B1 | 1/2002 | See et al. ................... 713/202 |
| 6,393,482 | B1 * | 5/2002 | Rai et al. .................... 709/225 |
| 6,396,828 | B1 | 5/2002 | Liu ............................. 370/352 |
| 6,445,922 | B1 | 9/2002 | Hiller et al. |
| 6,452,920 | B1 * | 9/2002 | Comstock ................... 370/349 |
| 6,466,964 | B1 | 10/2002 | Leung et al. ............... 709/202 |
| 6,473,413 | B1 | 10/2002 | Chiou et al. ................ 370/331 |
| 6,496,491 | B1 * | 12/2002 | Chuah et al. ............... 370/331 |
| 6,496,855 | B1 | 12/2002 | Hunt et al. .................. 709/217 |
| 6,522,880 | B1 | 2/2003 | Verma et al. |
| 6,535,493 | B1 | 3/2003 | Lee et al. .................... 370/329 |
| 6,571,289 | B1 * | 5/2003 | Montenegro ................ 709/227 |
| 6,577,643 | B1 * | 6/2003 | Rai et al. .................... 370/466 |
| 6,578,085 | B1 | 6/2003 | Khalil et al. ................ 709/241 |
| 6,587,882 | B1 | 7/2003 | Inoue et al. ................ 709/227 |
| 6,625,135 | B1 | 9/2003 | Johnson et al. ............. 370/332 |
| 6,651,105 | B1 | 11/2003 | Bhagwat et al. ............ 709/239 |
| 6,665,537 | B1 | 12/2003 | Lioy ........................ 455/435.1 |
| 6,683,871 | B1 | 1/2004 | Lee et al. |
| 6,707,809 | B1 * | 3/2004 | Warrier et al. .............. 370/351 |
| 6,742,036 | B1 | 5/2004 | Das et al. .................... 709/226 |
| 6,795,857 | B1 | 9/2004 | Leung et al. ............... 709/224 |
| 6,947,401 | B1 * | 9/2005 | El-Malki et al. ............ 370/331 |
| 2002/0026527 | A1 | 2/2002 | Das et al. .................... 709/245 |
| 2002/0147837 | A1 | 10/2002 | Heller |
| 2004/0024901 | A1 | 2/2004 | Agrawal et al. ............ 709/238 |

FOREIGN PATENT DOCUMENTS

| | | | |
|---|---|---|---|
| EP | 0978977 | A1 | 2/2000 |
| EP | 1124396 | A2 | 8/2001 |

OTHER PUBLICATIONS

R. Droms, "*Dynamic Host Configuration Protocol*", RFC 2131, Mar. 1997, pp. 1-39.

Helmy et al., "*Efficient Micro-Mobility using Intra-Domain Multicast-Based Mechanisms(M&M)*", ACM SIGCOMM Computer Communications Review, vol. 32, No. 5: Nov. 2002, pp. 61-72, XP-002279254.

Calhoun and Perkins, "*Mobile IP Network Access Identifier Extension for IPv4*", Jan. 12, 2000.

J. Postel, "*Simple Mail Transfer Protocol*", STD 10, RFC 821, Aug. 1982.

D. Crocker and P. Overrell, "*Augmented BNF For Syntax Specifications: ABNF*", RFC 2234, Nov. 1997.

*International Search Report PCT/US 03/38568*, 4 pp., mailed May 21, 2004.

*International Search Report PCT/US2004/013365*, 7 pp., mailed Oct. 5, 2004.

Release notes for 3Com Corporation, "Conducting a Redundant Route for Network Resiliency," March 1994, *NET Builder Family Bridge/Router* pp. 26-29.

J. Moy, RFC 1247 "OSPF Version 2," Jul. 19, 1001.

D. Oran, RFC 1142 "OSI IS-IS Intra-domain Routing Protocol," Feb. 1990.

Uyless Black, "TCP/IP and Related Protocols," 1992, *McGraw-Hill, Inc.,* pp. 226-249.

T. Li, et al., RFC 2281 "Cisco Hot Standby Router Protocol (HSRP)" Mar. 1998.

Chambless, et al., "Home Agent Redundancy Protocol (HARP)," Oct. 27, 1997.

Network Working Group, RFC 2002 "IP Mobility Support," Oct. 1996.

B. Adoba, et al., Network Working Group, RFC 2486 "The Network Access Identifier," Jan. 1999.

Kent K. Leung, U.S. Appl. No. 09/227,399, "Mobile IP Authentication", filed Jan. 8, 1999.

C. Perkins, "*IP Mobility Support,*" RFC 2002, IBM Corporation, Oct. 1996.

"*Mobile IP,*" Release 12.0(1)T, pp. 1-55.

Montenegro, G., "*Reverse Tunneling for Mobile IP,*" RFC 2344, Sun Microsystems, Inc., pp. 1-19, May 1998.

D. Harkins and D. Carrel, "*The Internet Key Exchange (IKE),*" Cisco Systems, pp. 1-33, Jun. 1998.

D. Cong and M. Hamlen, and C. Perkins, "*The Definitions of Managed Objects for IP Mobility Support Using SMIv2,*" RFC2006, Motorola and IBM, pp. 1-52, Oct. 1996.

C. Finseth, "*An Access Control Protocol, Sometimes Called TACACS,*" RFC1492, pp. 1-15, Sep. 13, 1992.

D. Carrel and Lol Grant, "*The TACACS+ Protocol,*" Network Working Group, Internet-Draft, Cisco Systems, pp. 1-42, Jan. 1997.

C. Rigney, "*RADIUS Accounting,*" RFC 2139, Livingston, pp. 1-25, Apr. 1997.

C. Rigney, "*Remote Authentication Dial in User Service (RADIUS),*" RFC 2138, pp. 1-65 Apr. 1997.

Perkins & Hobby, Network Working Group, RFC 1172 "The Point-to-Point Protocol (PPP) Initial Configuration Options", Jul. 1990.

W. Simpson, Network Working Group, RFC 1994 PPP Challenge Handshake Authentication Protocol (CHAP), Aug. 1996.

Lloyd, et al., Network Working Group, RFC 1334 "PPP Authentication Protocols", Oct. 1992.

McGregor, Network Working Group, RFC 1332 "The PPP Internet Control Protocol (IPCP)", May 1992.

Simpson, ed., Network Working Group, RFC 1661, "The Point-to-Point Protocol (PPP)", Jul. 1994.

* cited by examiner

FA Registration Table

| Node ID (e.g., IP address) 1102 | Home Agent Address 1104 | Sequence # 1106 |
|---|---|---|
|  |  |  |
|  |  |  |

FIG. 11

HA Mobility Binding Table

| Node ID (e.g., IP address) 1202 | COA (e.g., FA address) 1204 | Proxy Sequence # (opt) 1206 |
|---|---|---|
|  |  |  |
|  |  |  |

FIG. 12

ENABLING MOBILITY FOR POINT TO POINT PROTOCOL (PPP) USERS USING A NODE THAT DOES NOT SUPPORT MOBILITY

BACKGROUND OF THE INVENTION

1. Field of the Invention

The present invention relates to Mobile IP network technology. More particularly, the present invention relates to enabling mobility for PPP users using a node that does not support mobility through performing a proxy registration via a foreign agent on behalf of the node.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

During registration of a mobile node with its Home Agent, the identities of the sending party of the registration request (e.g., mobile node) and the sending party of the registration reply (e.g., Home Agent) are authenticated. During the registration process, a Mobile-Home Authentication Extension is typically appended to both the registration request and the registration reply. Upon receipt of the registration request by the Home Agent and the registration reply by the mobile node, the identity of the sending party is authenticated through the application of the Mobile-Home Authentication Extension.

RFC 1334 describes two different Point-to-Point Protocol (PPP) authentication protocols. The Point-to-Point Protocol (PPP) provides a standard method of encapsulating Network Layer protocol information over point-to-point links. PPP also defines an extensible Link Control Protocol, which allows negotiation of an Authentication Protocol for authentication of its peer before allowing Network Layer protocols to transmit over the link. RFC 1334 defines two protocols for Authentication: the Password Authentication Protocol (PAP) and the Challenge-Handshake Authentication Protocol (CHAP).

As shown in FIG. 2, Point to Point Protocol (PPP) is used widely by users 202 (e.g., from home 204) to dial into a computer 206 associated with a company, university, or Internet Service Provider (ISP). When the user dials in, a Network Access Server (NAS) 208 typically requests a username and password from the user. In response, an IP address is provided to the user when the user dials in via a phone line and connects to the NAS 208, providing a dial-in environment. In this manner, the user may access the Internet 210 through a PPP connection.

While it is a simple task for a user to access the Internet via a PPP connection, the PPP connection is a fixed connection. Typically, the NAS 208 will provide a user with an IP address from a pool of IP addresses when the user dials in. However, since this pool of IP addresses is associated with the NAS 208, the IP address is also fixed. As a result, this IP address cannot be used by a user who wishes to roam to a Foreign Agent from its Home Agent (e.g., home network associated with the company 206). Moreover, it is important to note that a node that implements the PPP protocol does not typically support Mobile IP. Thus, a PPP user has not traditionally been able to roam while remaining connected via a PPP connection.

In view of the above, it would be desirable to provide Internet services via a wireless link for mobile users who attach to a network via a PPP connection. Thus, it would be beneficial if PPP and Mobile IP could be integrated to provide seamless roaming capabilities. Moreover, it would be beneficial if such capabilities could be provided even where the node does not support Mobile IP.

SUMMARY OF THE INVENTION

The present invention enables Internet services to be provided via a wireless link for mobile users who attach to a network via a PPP connection. This is accomplished, in part, through obtaining information associated with a PPP node from a PPP node profile. Thus, the present invention enables mobility even where the node does not support Mobile IP.

In accordance with one aspect of the invention, a method of sending a registration request packet on behalf of a node that supports PPP but does not support Mobile IP is implemented in a Foreign Agent. The method comprises accepting a call from the node and receiving authentication information associated with a PPP authentication protocol from the node, the authentication information enabling a PPP node to be authenticated. From this authentication information, a PPP node profile is obtained. The PPP node profile includes registration information associated with the node that enables proxy registration to be performed by the Foreign Agent on behalf of the node, where the registration information associated with the node identifies a Home Agent associated with the node. The registration information may also include other information that may be pertinent to the composition of a registration request packet. A registration request packet including the registration information associated with the node is then composed and sent to the Home Agent on behalf of the node.

In accordance with another aspect of the invention, the registration request packet that is sent by the Foreign Agent includes a registration indicator indicating whether registration being performed by the Foreign Agent on behalf of the node is a re-registration by the Foreign Agent or an initial registration by the Foreign Agent. More particularly, in accordance with one embodiment, the registration request packet includes a sequence number indicating an order within a sequence of one or more registrations performed by one or more Foreign Agents on behalf of the node. From the sequence number, a Home Agent receiving the registration request packet may determine whether the Foreign Agent is performing a re-registration or an initial registration on behalf of the node.

In accordance with yet another aspect of the invention, a method of processing a registration request packet composed on behalf of a node that supports the Point-to-Point Protocol is implemented in a Home Agent. The method comprises receiving the registration request packet from a Foreign Agent that is performing proxy registration on behalf of the node, where the registration request packet includes a sequence number indicating an order within a sequence of one or more registrations performed by one or more Foreign Agents on behalf of the node. The Home Agent determines from the sequence number whether to accept registration of the node with the Home Agent. A registration reply packet indicating whether registration of the node with the Home Agent is accepted is composed and the registration reply packet is sent to the Foreign Agent.

BRIEF DESCRIPTION OF THE DRAWINGS

FIG. 11 is a diagram illustrating an exemplary Foreign Agent registration table that may be updated to indicate whether a registration is an initial registration or a re-registration.

FIG. 12 is a diagram illustrating an exemplary Home Agent mobility binding table that may be updated to indicate whether a registration is an initial registration or a re-registration.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In the following description, a AAA server refers to a server that provides authentication services and/or authorization services. While authentication determines who an entity is, authorization determines what services a user is allowed to perform, or access. The AAA server is also capable of storing security-associations for multiple Home Agents. By way of example, the centralized server may Various protocols such as the Remote Authentication Dial In User Service (RADIUS) and TACACS+ may be implemented to provide such a server. In addition, this protocol may similarly be implemented on each Home Agent that communicates with the server. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

Figure 1:
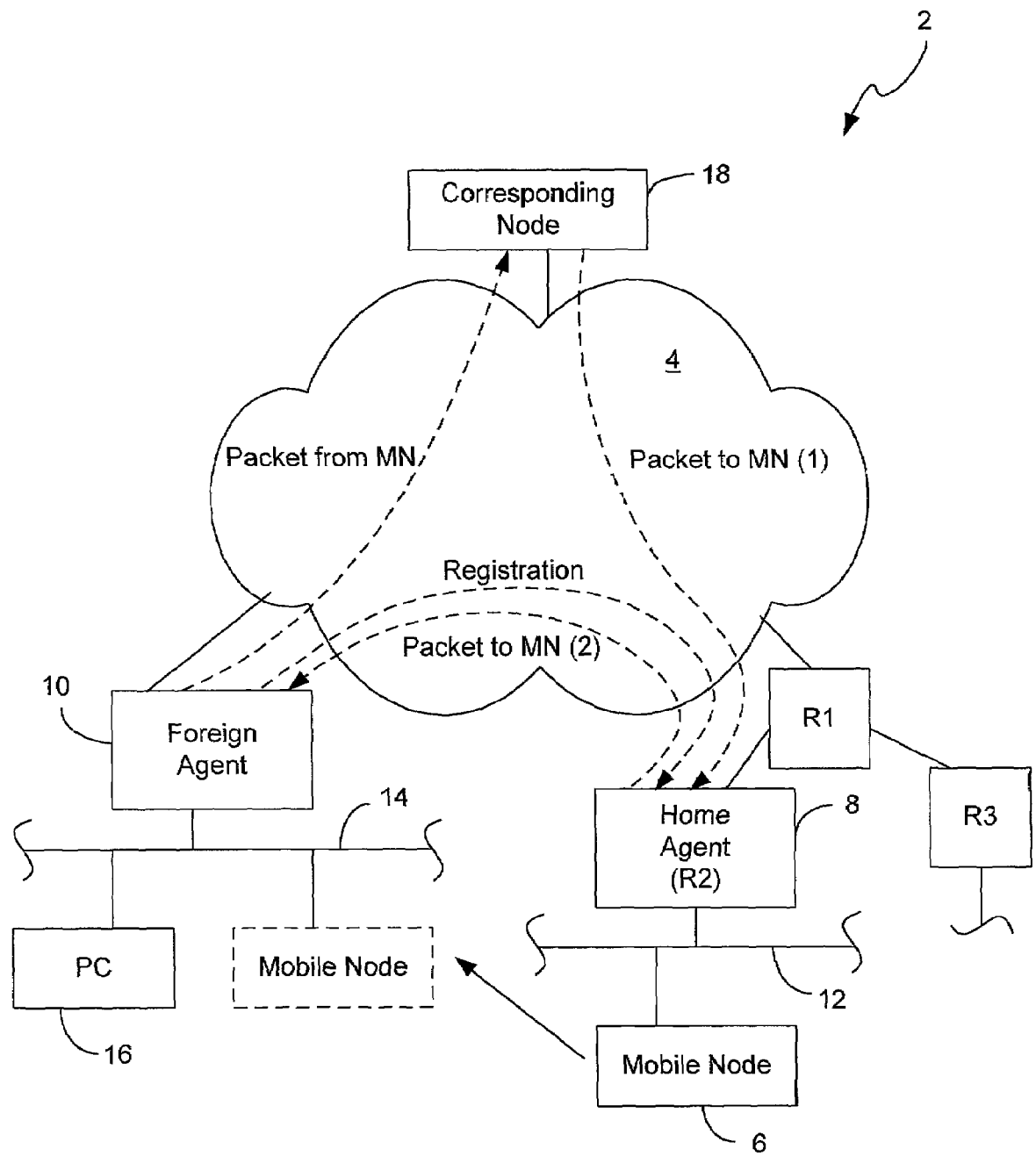
FIG. 1 is a diagram illustrating a Mobile IP network segment and associated environment.
Figure 2:
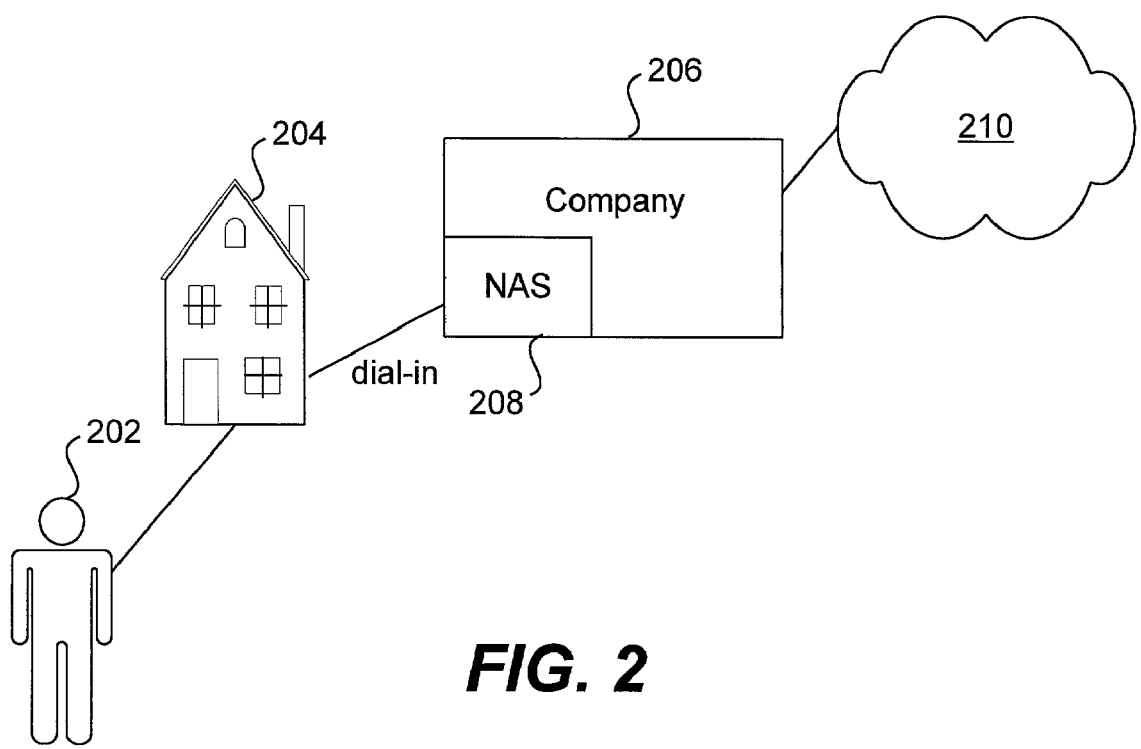
FIG. 2 is a block diagram illustrating a Point to Point Protocol connection provided between a user and a Network Access Server.
Figure 3:
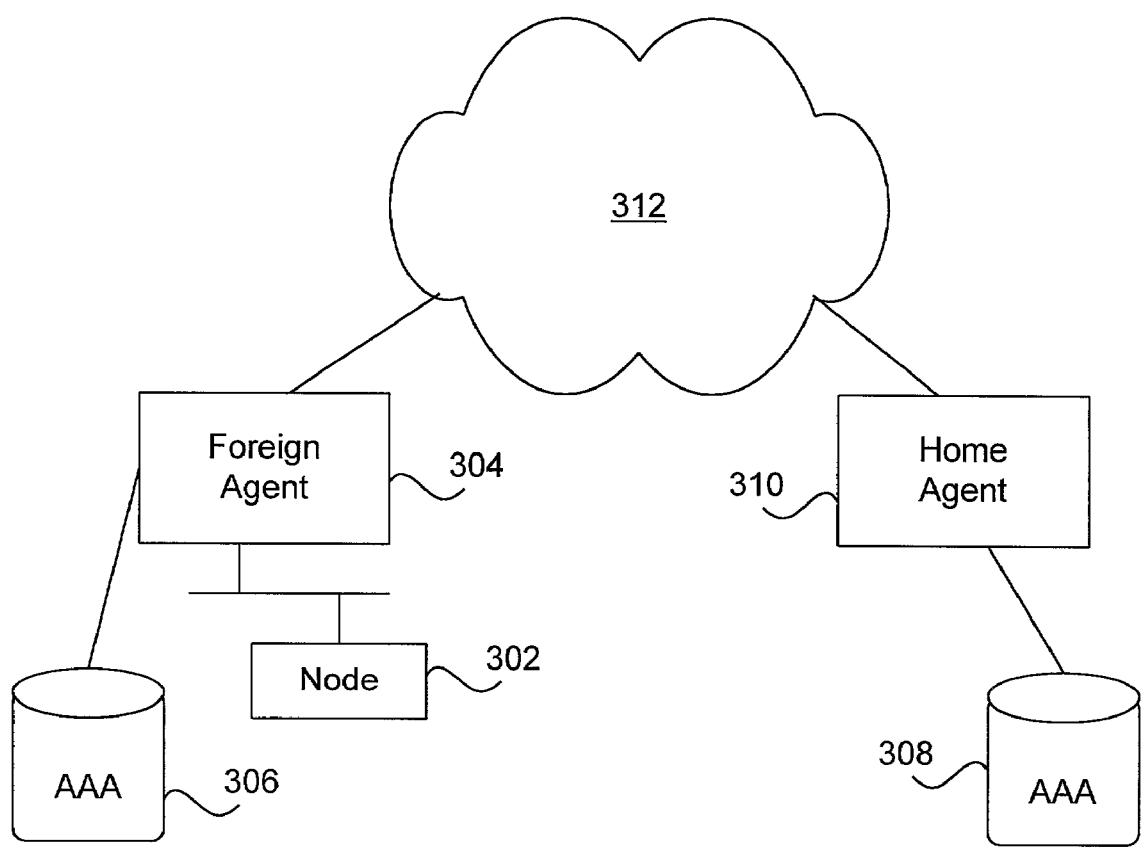
FIG. 3 is a block diagram illustrating a system that enables a node that does not support Mobile IP to roam to a Foreign Agent by establishing a PPP connection with the Foreign Agent which performs a proxy registration with a Home Agent on behalf of the node.

FIG. 3 is a block diagram illustrating a system that enables a node that does not support Mobile IP to roam to a Foreign Agent by establishing a PPP connection with the Foreign Agent which performs a proxy registration with a Home Agent on behalf of the node. As shown, once a call from a node 302 is accepted by Foreign Agent 304, the node 302 sets up a PPP session with a Foreign Agent 304. During this process, the node 302 attempts to connect to the Foreign Agent 304 through a PPP authentication protocol such as the Challenge-Handshake Authentication Protocol (CHAP). Although the Password Authentication Procedure (PAP) may also be used, CHAP is a more secure procedure. RFC 1994 describes the PPP Challenge Handshake Authentication Protocol, which is incorporated herein by reference for all purposes. In accordance with the Challenge Handshake Authentication Protocol, challenge and response packets are exchanged. In this manner, authentication information associated with a PPP authentication protocol such as CHAP is received from the node 302. More particularly, the authentication information may include information exchanged in the challenge and response packets such as a user ID or password submitted by the node during PPP authentication.

Once the Foreign Agent has obtained authentication information that enables a PPP node to be authenticated, a PPP node profile associated with this authentication information may be obtained. The PPP node profile includes registration information associated with the node that enables proxy registration to be performed by the Foreign Agent on behalf of the node. In other words, the registration information may be used to compose a registration request that is sent to an appropriate Home Agent. For example, the registration information may identify a Home Agent associated with the node, a key to be shared between the Home Agent and the Foreign Agent, a service selection indicating that PPP service is normal PPP service, mobile IP, or proxy mobile IP, a registration lifetime for the node, and/or a Home Address for the node.

In accordance with one embodiment, in order to obtain a PPP node profile, the Foreign Agent 304, acting as a Network Access Server (NAS), sends a request packet (e.g., RADIUS access request packet) including the authentication information to a visited AAA server 306. The visited AAA server 306 may then authenticate the node 302 as a valid PPP user using the authentication information in the access request message and send an access reply message to the Foreign Agent 304. However, since the Foreign Agent may not have information about the user which allows it to authenticate the node, the Foreign Agent 304 may forward the access request message including the information in the challenge and response packets to a second AAA server 308 associated with a Home Agent 310 of the node 302. This second AAA server 308 associated with the Home Agent 310 then sends an access reply message to the visited AAA server 306 indicating whether the node 302 has been authenticated.

Regardless of whether the access reply message is initially created by the AAA server 308 associated with the Home Agent 310 or the visited AAA server 306, the visited AAA server 306 then sends the access reply message to the Foreign Agent 504.

Once the PPP connection is established, the Foreign Agent 304 sends a proxy mobile IP registration request on behalf of the node 302 via the Internet 312 to the Home Agent 310 using the obtained PPP node profile. The Home Agent 310 then sends a Mobile IP registration reply to the Foreign Agent 304. PPP Internet Protocol Control Protocol (IPCP) is then completed to establish and configure IP between the node 302 and the Foreign Agent 304. RFC 1172 of the Network Working Group, D. Perkins, July 1990 describes IPCP, and is incorporated herein by reference for all purposes. During the completion of IPCP, the IP address is negotiated for the node 302. More particularly, the IP address is obtained from the registration reply if one is received. Otherwise, the IP address received during CHAP authentication is obtained from the access reply (e.g., from the PPP node profile) as described above.

Figure 4:
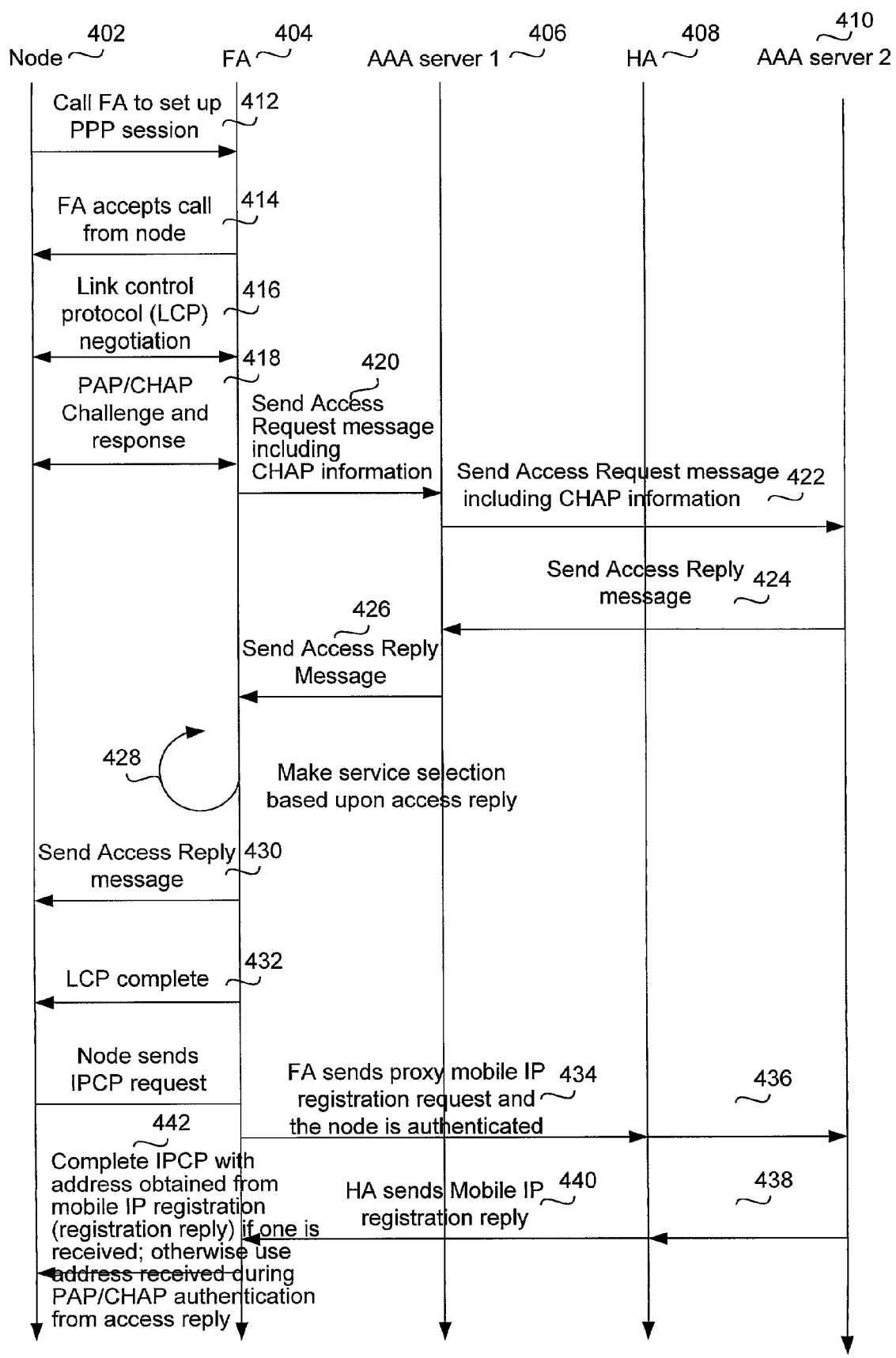
FIG. 4 is a general process flow diagram illustrating a method of implementing the present invention.

FIG. 4 is a general process flow diagram illustrating a method of implementing the present invention in accordance with an embodiment of the invention. As shown in FIG. 4, vertical line 402 represents steps performed by a PPP node, vertical line 404 represents steps performed by the Foreign Agent, vertical line 406 represents steps performed by a server associated with the Foreign Agent, vertical line 408 represents steps performed by the Home Agent, and vertical line 410 represents steps performed by a server associated with the Home Agent. As shown at 412, the node 402 calls the Foreign Agent to set up a PPP session. The Foreign Agent 404 accepts the call from the node 402 at 414. Link control protocol (LCP) negotiation is performed at 416. Authentication protocol challenge and response packets are exchanged at 418 in accordance with an authentication protocol such as CHAP. The authentication information obtained during this challenge and response exchange is then used to obtain a PPP node profile which contains information that will enable a registration request packet to be composed and sent to the appropriate Home Agent.

In accordance with one embodiment, a PPP node profile is obtained from a AAA server. More particularly, as shown at 420, the Foreign Agent composes and sends a request packet (e.g., RADIUS access request packet) including authentication information (e.g., CHAP information) to the visited AAA server 406. In addition, it is important to note that the AAA server also be capable of storing a profile for one or more nodes supporting PPP. As described above, the authentication information may include a password as well as a user ID entered by the node that may be used to authenticate the node as a PPP node. In the event that the visited AAA server 406 is unable to authenticate the node, the access request message is forwarded to the home AAA server 410 as shown at 422. A PPP node profile, or portion thereof, associated with the authentication information is then obtained from the home AAA server 410. A reply packet (e.g., RADIUS access reply packet) including the PPP node profile, or portion thereof, is then sent from the home AAA server 410 to the visited AAA server 406 as shown at 424. The access reply packet is then sent from the visited AAA server 406 to the Foreign Agent 404 as shown at 426. It is important to note that if the visited AAA server 406 is able to authenticate the node, this access reply packet will originate from the visited AAA server 406 at 426 rather than be forwarded from the home AAA server 410.

As described above, the PPP node profile includes registration information associated with the node that enables proxy registration to be performed by the Foreign Agent on behalf of the node. In other words, the registration information will be used to compose a registration request that is sent to an appropriate Home Agent. For example, the registration information may identify a Home Agent associated with the node, a key to be shared between the Home Agent and the Foreign Agent, a service selection indicating that PPP service is normal PPP service, mobile IP, or proxy mobile IP, a registration lifetime for the node, and/or a Home Address for the node.

The Foreign Agent then makes a service selection based upon the registration information in the access reply at 428. More particularly, the registration information identifies a service selection indicating that PPP service is normal PPP service, mobile IP service, or proxy mobile IP service. Thus, when the service selection indicates that PPP service is proxy mobile IP service, the Foreign Agent is made aware that it must compose a registration request including the registration information on behalf of the node.

Prior to composing a registration request on behalf of the node, the authentication of the PPP node is acknowledged by sending a PPP authentication response (e.g., CHAP response) to the node as shown at 430. Next, at 432 a LCP packet is sent to the node 402 indicating that communications are established over the point-to-point link.

As described above, the Foreign Agent has determined from the service selection that PPP service is proxy mobile IP service. In addition, the registration information previously obtained identifies the Home Agent. Thus, the Foreign Agent composes a registration request packet including the registration information associated with the node and sends the registration request packet to the Home Agent on behalf of the node at 434. In addition, the Foreign Agent may provide the authentication information in the registration request packet. For instance, the authentication information may include a user ID, a password, and/or a key that may be used to authenticate the identity of the node. This authentication information is preferably provided in an extension to the registration request packet.

Authentication may be performed by the Home Agent 408 or the home AAA server 410. If the Home Agent has received a key in the registration request packet, the Home Agent may authenticate the identity of the node. Otherwise, the Home Agent may send the authentication information (e.g., the registration request packet) to the home AAA server as shown at 436.

When the identity of the node is authenticated, a reply packet (e.g., registration reply packet) is sent from the home AAA server 410 as shown at 438 when authentication has been performed by the home AAA server 410. Otherwise, a registration reply packet is sent from the Home Agent at 440 to the Foreign Agent. In addition, the Home Agent may allocate an IP address to the node and provide the IP address (i.e., Home Address) in the registration reply packet. IPCP is then completed at 442 to establish and configure IP between the node 402 and the Foreign Agent 404. During the completion of IPCP, the IP address is negotiated for the node 402. More particularly, the IP address is obtained from the registration reply if one is received. Otherwise, the IP address received during CHAP authentication is obtained from the access reply (e.g., from the PPP node profile) as described above.

Figure 5:
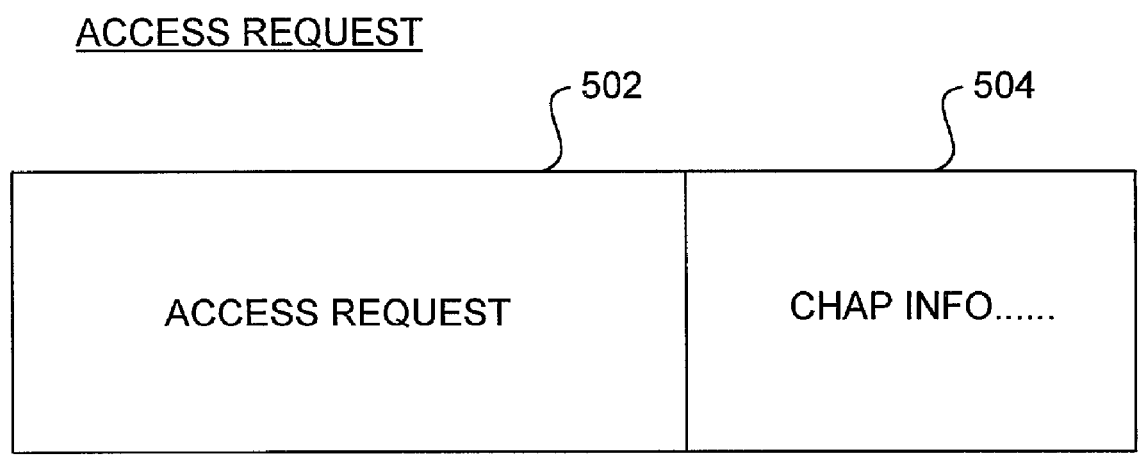
FIG. 5 is a diagram illustrating an access request packet that may be used to send authentication information to a AAA server for authentication of a PPP user in accordance with an embodiment of the invention.

As described above, a request packet may be used to carry authentication information to a AAA server to obtain a PPP node profile. FIG. 5 is a diagram illustrating a request packet that may be used to send authentication information to a AAA server for authentication of a PPP user in accordance with an embodiment of the invention. In accordance with one embodiment, the request packet is a RADIUS access request packet 502. In this access request packet, authentication information 504 is provided. For instance, the authentication information may include information obtained via CHAP challenge and response exchanges.

Figure 6A:
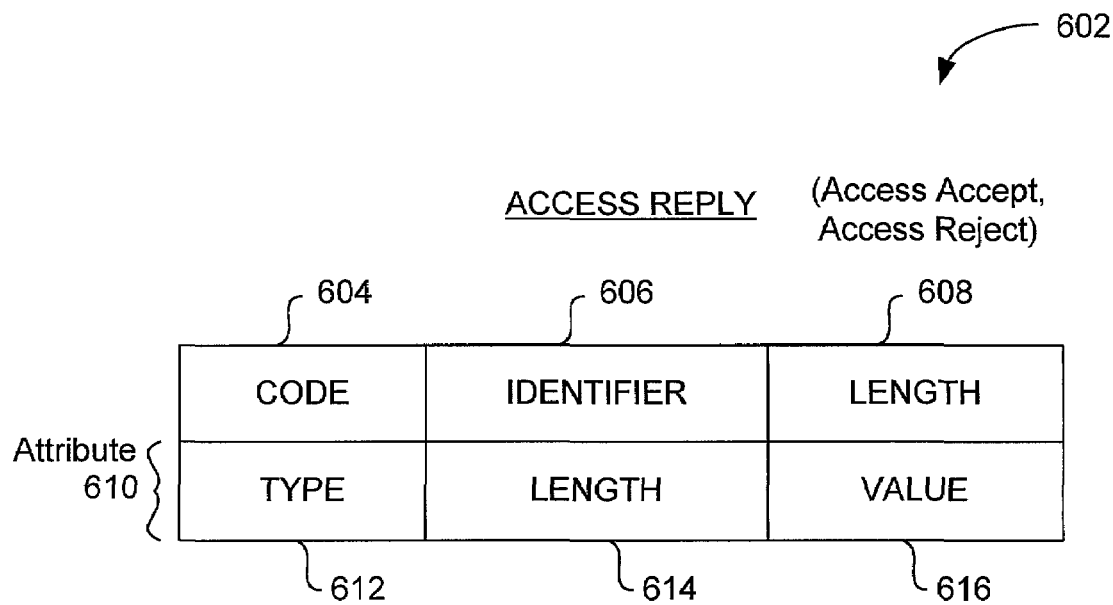
FIG. 6A is a diagram illustrating an access reply packet that may be used to transport a PPP node profile to a Foreign Agent performing proxy registration on behalf of a PPP node in accordance with an embodiment of the invention.

Once a PPP node profile is obtained, the PPP node profile or portion thereof may be carried via a reply packet. FIG. 6A is a diagram illustrating a reply packet that may be used to transport a PPP node profile to a Foreign Agent performing proxy registration on behalf of a PPP node in accordance with an embodiment of the invention. In accordance with one embodiment, the reply packet is a RADIUS access reply packet 602. As shown, the RADIUS access reply packet 602 includes a code field 604 that is used to indicate that the packet is a reply packet, an identifier field 606 that is copied from the identifier field of the request packet, and a length field 608 that specifies the length of the packet. The reply packet includes one or more attributes 610. More particularly, each attribute includes a type 612, length 614, and value 616. The type 612 will indicate the type of attribute such as a service selection attribute which will be described in further detail below with reference to FIG. 6B. The length 614 will indicate the length of the corresponding attribute 610, and the value 616 will indicate the value of the attribute being transmitted. For instance, the value of the service selection attribute may be normal, Mobile IP, or proxy Mobile IP. The length will vary with the number of attributes transported in the reply packet.

Figure 6B:
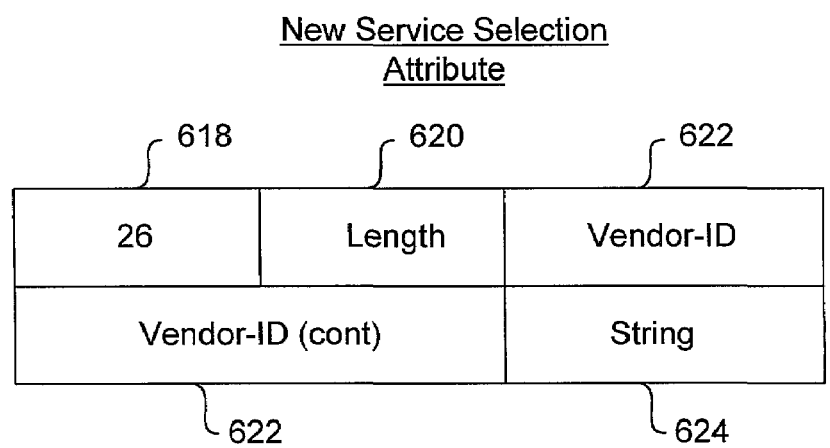
FIG. 6B is a diagram illustrating a service selection attribute that may be provided in an access reply packet such as that illustrated in FIG. 6A to transport a service selection attribute portion of a PPP node profile to a Foreign Agent performing proxy registration on behalf of a PPP node.

As described above with reference to FIG. 6A, various attributes that make up a PPP node profile may be transported in an access reply packet. FIG. 6B is a diagram illustrating an exemplary service selection attribute that may be provided in an access reply packet such as that illustrated in FIG. 6A to transport a service selection attribute portion of a PPP node profile to a Foreign Agent performing proxy registration on behalf of a PPP node. The service selection attribute shown identifies type 618 as a service selection attribute through specification of the type 618 as "26." Length 620 identifies the length of the attribute while vendor-ID 622 may vary according to vendor. The value of the attribute is specified as a string 624 which may be "normal", "mobile IP", or "proxy mobile IP".

Figure 7:
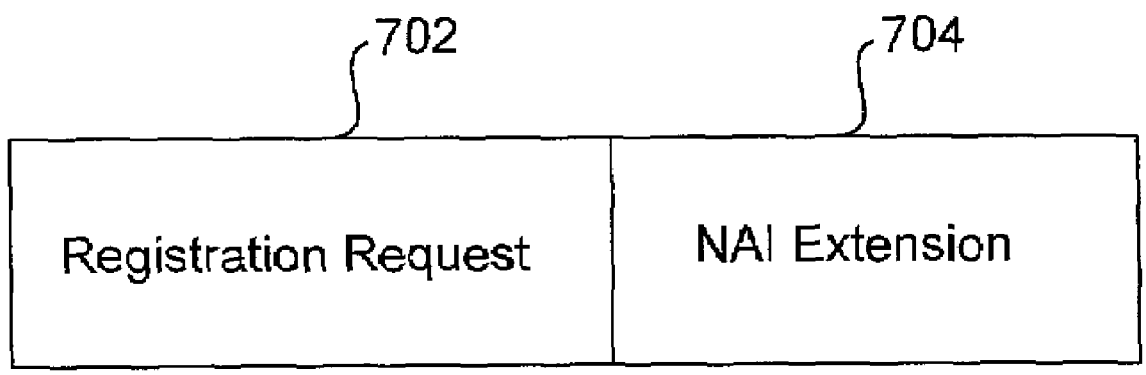
FIG. 7 is a diagram illustrating a registration request packet that may be used to transport authentication information for purposes of authentication of the registration request packet in accordance with an embodiment of the invention.

Once the PPP node profile including registration information (e.g., attributes) has been obtained by the Foreign Agent, the Foreign Agent sends a registration request packet using this registration information. FIG. 7 is a diagram illustrating a registration request packet that may be used to transport authentication information for purposes of authentication of the registration request packet in accordance with an embodiment of the invention. A registration request packet 702 includes the registration information within appropriate fields (not shown) within the registration request packet 702. In addition, authentication information that may be used to authenticate the identity of the PPP node may be provided in an extension 704 to the registration request packet 702.

Once a PPP node is registered with its Home Agent via the proxy registration process described above, it may roam to another Foreign Agent. This second Foreign Agent may send a registration request packet on behalf of the node, thereby registering the node with its Home Agent. However, since the node has not itself initiated this second registration (and therefore has not de-registered), the first Foreign Agent may be unaware that the node has roamed to a new location within the network. More particularly, PPP may be in a dormant state which prevents the first Foreign Agent from learning that the node has moved to another Foreign Agent. As a result, the first Foreign Agent may try to re-register when the lifetime of the first registration expires. In order to solve this problem, the present invention distinguishes between an initial registration by a Foreign Agent on behalf of the node and a subsequent or "re-registration" by the Foreign Agent on behalf of the node.

Figure 8:
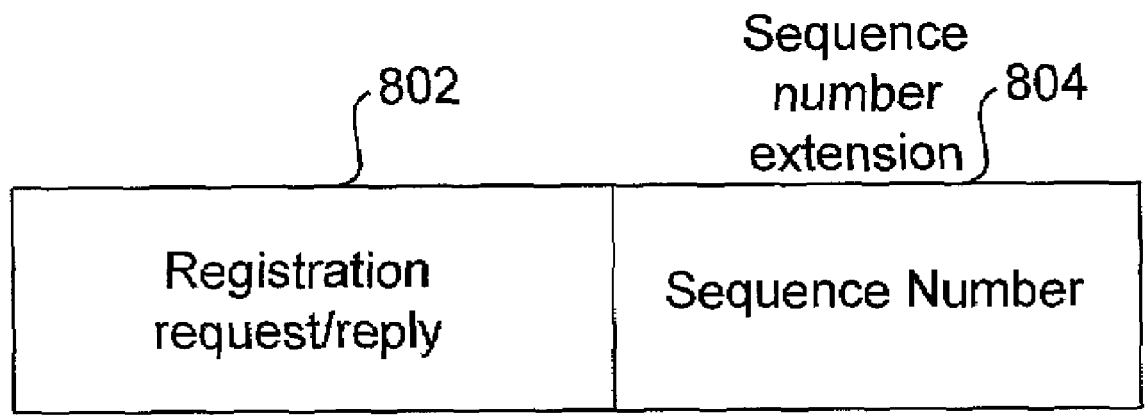
FIG. 8 is a diagram illustrating an exemplary format that may be used for registration request and reply packets to indicate whether a registration is an initial registration or a re-registration being performed on behalf of a node.

In accordance with one embodiment of the invention, an initial proxy registration performed by a Foreign Agent on behalf of a node is distinguished from a "re-registration" by a Foreign Agent on behalf of the node through the use of a sequence number indicating an order of the registration within a sequence of one or more registrations performed by one or more Foreign Agents on behalf of the node. FIG. 8 is a diagram illustrating an exemplary format that may be used for registration request and reply packets to indicate whether a registration is an initial registration or a re-registration being performed on behalf of a node. As shown, each registration request/reply 802 includes a proxy Mobile Node registration sequence number extension indicating a sequence number for a registration being performed on behalf of the node. Process flow diagrams depicting methods for performing proxy registration using such a registration request/reply will be described in further detail below with reference to FIGS. 9, 10A, and 10B.

Figure 9:
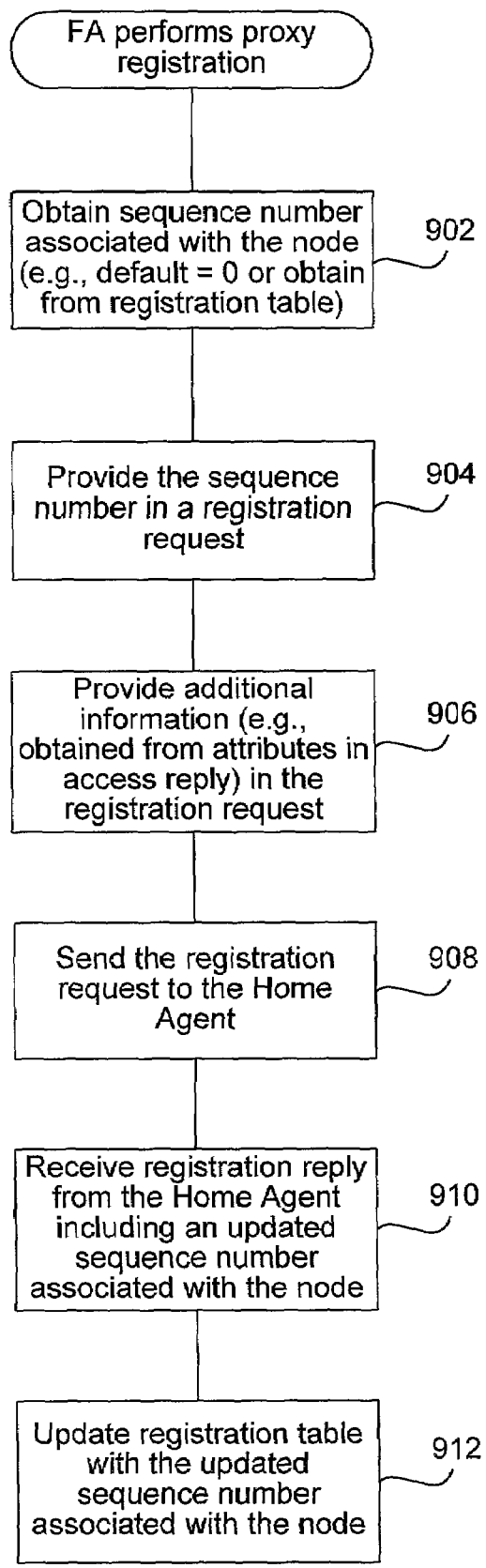
FIG. 9 is a process flow diagram illustrating a method of performing proxy registration by a Foreign Agent in accordance with an embodiment of the invention.

When a call is accepted from a node, the Foreign Agent performs proxy registration on behalf of the node. FIG. 9 is a process flow diagram illustrating a method of performing proxy registration by a Foreign Agent in accordance with an embodiment of the invention. When the Foreign Agent initiates a proxy registration, it obtains a sequence number associated with the node at block 902. The sequence number is zero to indicate that the registration is an initial registration being performed on behalf of the node. For subsequent registrations, the sequence number is obtained from a registration table that identifies the node, a Home Agent associated with the node, and a sequence number.

Once the sequence number is obtained, the sequence number is provided in a registration request packet at block 904. More particularly, the sequence number is provided in a proxy Mobile Node extension to the registration request. As described above, the sequence number indicates a registration being performed by the Foreign Agent on behalf of the node among a sequence of one or more registrations performed on behalf of the node. Additional information such as the registration information obtained from the PPP node profile are also provided in the registration request at block 906. The Foreign Agent then sends the registration request to the Home Agent at block 908.

When the Home Agent completes processing the registration request, it sends a registration reply to the Foreign Agent. The Foreign Agent receives the registration reply from the Home Agent at block 910. The registration reply includes a proxy Mobile Node extension or registration indicator indicating whether a registration being performed on behalf of the node is a re-registration by the Foreign Agent or an initial registration by the Foreign Agent. For instance, in accordance with one embodiment, the registration reply includes a proxy Mobile Node registration sequence number extension that includes a sequence number for the registration being performed by the Foreign Agent on behalf of the node. As will be described in further detail below with reference to FIGS. 10A and 10B, the sequence number is updated by the Home Agent as appropriate prior to sending the updated sequence number in the registration reply. The Foreign Agent then updates a registration table to indicate whether the registration is an initial registration by the Foreign Agent or a re-registration by the Foreign Agent (e.g., by associating the updated sequence number with the node) at block 912.

Figure 10A:
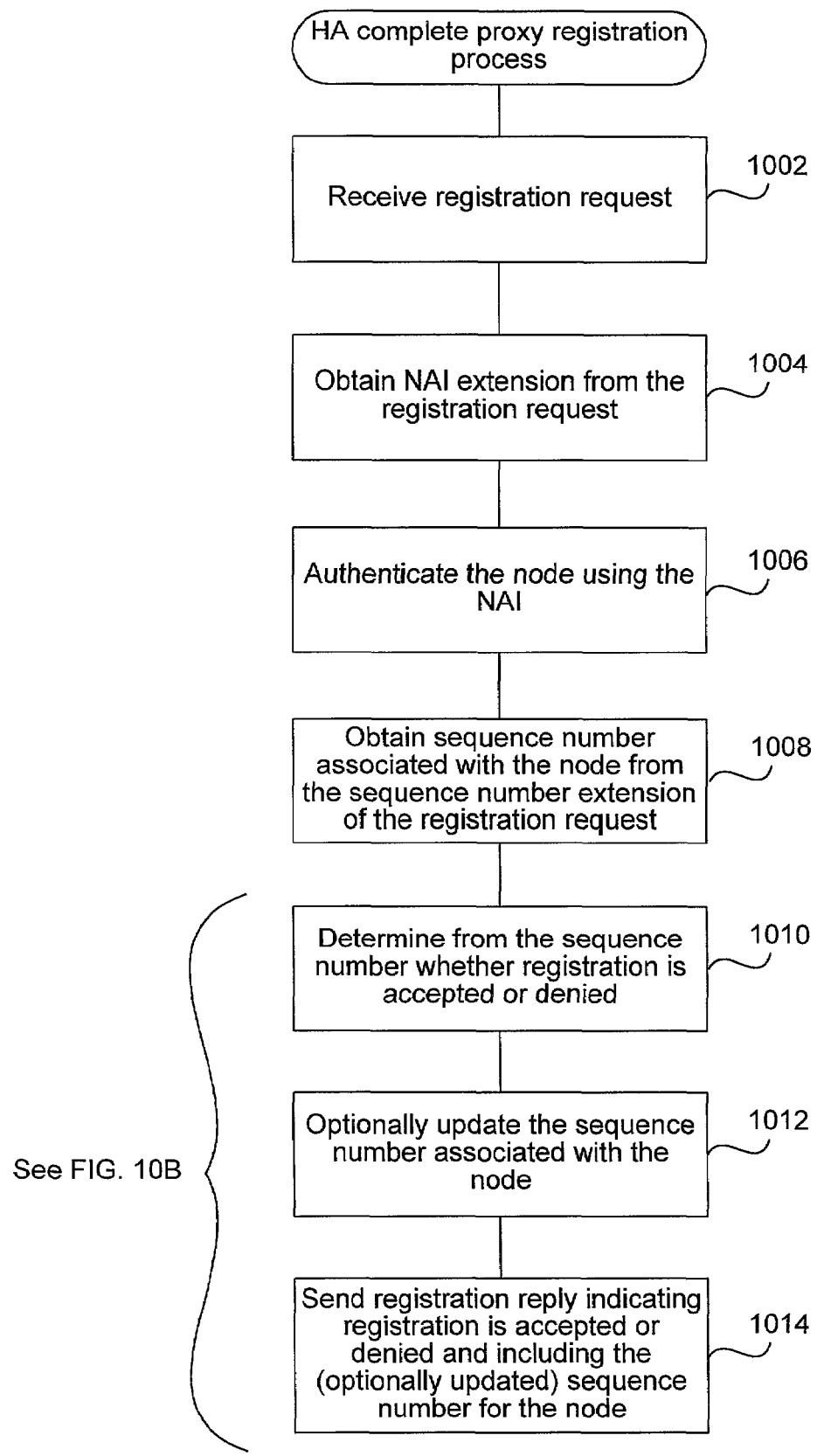
FIG. 10A is a process flow diagram illustrating a method of completing the proxy registration process by a Home Agent in accordance with an embodiment of the invention.

When a Home Agent receives a registration request from a Foreign Agent, it processes the registration request and sends a registration reply in response to the registration request. FIG. 10A is a process flow diagram illustrating a method of completing the proxy registration process by a Home Agent in accordance with an embodiment of the invention. The Home Agent receives a registration request packet from a Foreign Agent that is performing proxy registration on behalf of a node that supports the Point-to-Point Protocol at block 1002. As described above, the registration request packet includes a registration indicator indicating whether the registration is an initial registration or re-registration performed on behalf of the node. Alternatively, the registration request packet includes a sequence number indicating an order within a sequence of one or more registrations performed by one or more Foreign Agents on behalf of the node. The authentication information is preferably provided in an extension to the registration request packet. Thus, at block 1004 this extension is obtained from the registration request and the node is authenticated using the authentication information at block 1006.

The Home Agent obtains the registration indicator or the sequence number associated with the node from the sequence number extension of the registration request at block 1008. The Home Agent then determines from the registration indicator or the sequence number provided in the registration request packet whether to accept registration of the node with the Home Agent at block 1010. The sequence number (or registration indicator) is optionally updated at block 1012. A registration reply packet including the updated sequence number (or registration indicator) and indicating whether registration of the node with the Home Agent is accepted is composed and sent to the Foreign Agent at block 1014.

Figure 10B:
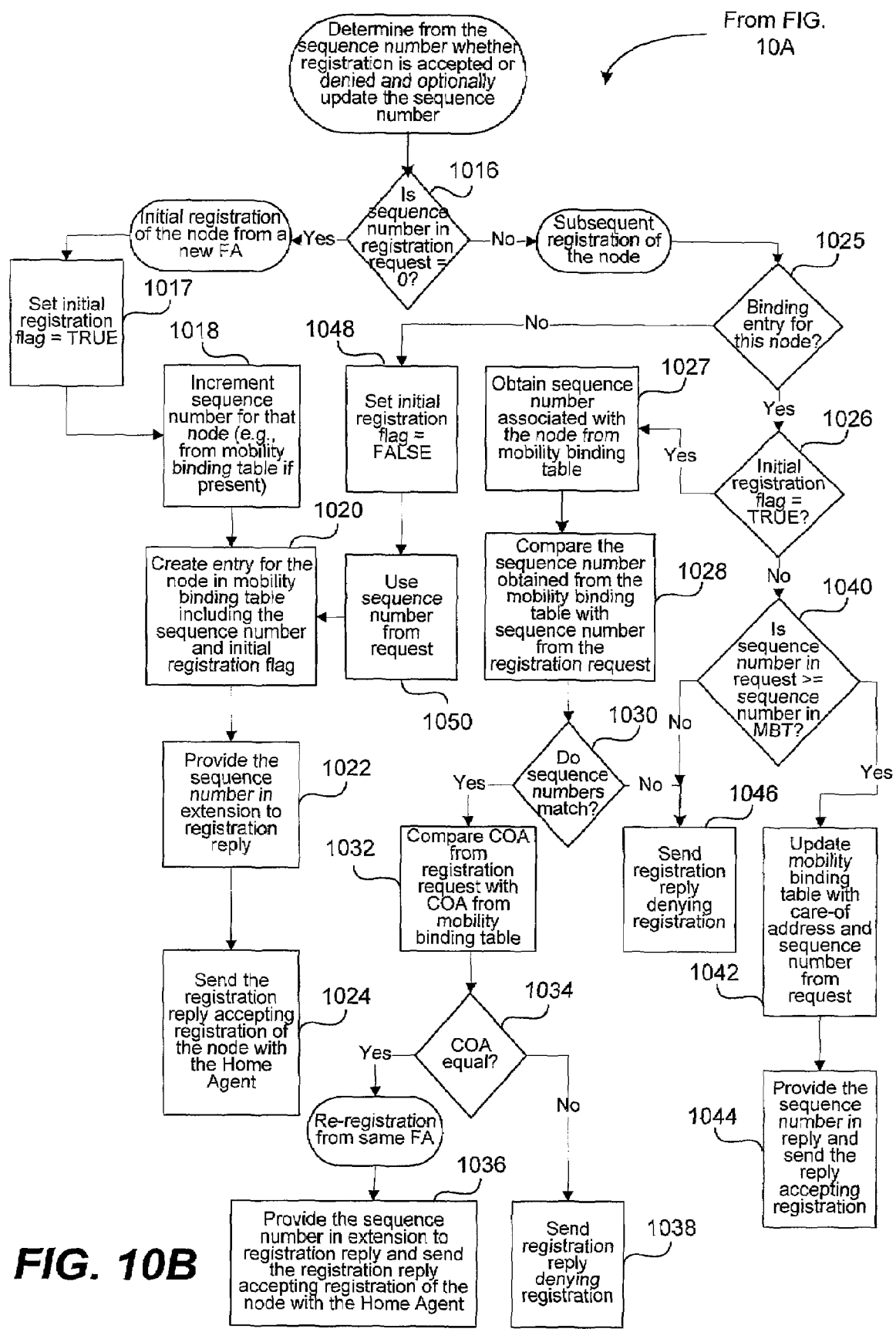
FIG. 10B is a process flow diagram illustrating a method of determining whether registration is accepted or denied, and updating tables and composing a registration reply in accordance with the determination as shown in FIG. 10A.

FIG. 10B is a process flow diagram illustrating a method of determining whether registration is accepted or denied, updating tables and composing a registration reply in accordance with blocks 1010, 1012 and 1014 of FIG. 10A. The Home Agent determines from the sequence number obtained from the registration request whether the registration corresponds to an initial registration of the node with the Home Agent at block 1016. This is accomplished by determining whether the sequence number is equal to zero. When the sequence number indicates that the registration request packet corresponds to the initial registration of the node with the Home Agent, an initial registration flag is set to TRUE at block 1017 and the sequence number for the node (e.g., from a mobility binding table) is incremented at block 1018. An entry is created in a mobility binding table (as necessary) indicating whether the registration is an initial registration by the Foreign Agent or a re-registration by the Foreign Agent. More particularly, the mobility binding table entry associates the updated sequence number with the node at block 1020. In addition, the initial registration flag may be stored in the mobility binding table. The updated sequence number is provided in the registration reply at block 1022 and the registration reply accepting registration of the node with the Home Agent is sent at block 1024.

When the sequence number is not zero, the Home Agent has determined from the sequence number that the registration does not correspond to an initial registration of the node with the Home Agent. In other words, the Home Agent has determined that this is a subsequent registration of the node rather than an initial registration of the node. Moreover, if the Foreign Agent that has sent the registration request packet is attempting to perform re-registration on behalf of the node, the sequence number and the care-of address provided in the registration request packet should be equal to the sequence number and the care-of address in the mobility binding table.

As described above, the mobility binding table may store a sequence number for a node that has registered with the Home Agent. However, the sequence number may not be stored in the mobility binding table even when the node has previously registered with the Home Agent. For example, the Home Agent may have been rebooted and therefore the mobility binding table may have been lost. As another example, the mobility binding table may have been cleared by a user. Thus, it is determined at block 1025 whether there is a binding entry for the node in the mobility binding table.

When there is a binding entry for the node, it is determined whether the initial registration flag is set at block 1026. More particularly, the initial registration flag indicates whether this is an initial registration of the node from a new Foreign Agent. When the initial registration flag is TRUE when a subsequent registration is being performed, this indicates that this is an attempted re-registration from a Foreign Agent. Thus, the following steps are performed in order to determine whether this is a valid re-registration. Thus, at block 1027 a sequence number associated with the node is obtained from the mobility binding table. The sequence number obtained from the mobility binding table is then compared with the sequence number from the registration request at block 1028. If at block 1030 it is determined that the sequence number obtained from the mobility binding table matches the sequence number from the registration request packet, the Home Agent will accept registration of the node when it is determined that this "re-registration" is being performed by the appropriate Foreign Agent. More particularly, the care-of address from the registration request packet is compared to the care-of address in the mobility binding table entry at block 1032. If the care-of addresses are equal, the re-registration corresponds to the same Foreign Agent identified in the mobility binding table (e.g., prior registration). Thus, if the care-of addresses are also determined to be equal at block 1034, this is a valid re-registration from the same Foreign Agent. The sequence number is provided in an extension to a registration reply and the registration reply accepting registration of the node with the Home Agent is sent at block 1036. If the care-of addresses of the registration request and the mobility binding table are not equal, a registration reply denying registration is sent at block 1038. Similarly, if at block 1030 the sequence number stored in the mobility binding table is determined not to match the sequence number in the registration request, a registration reply denying registration is sent at block 1042.

When the initial registration flag indicates that this is not an initial registration of the node from a new Foreign Agent at block 1026, the appropriate tables are updated and registration is accepted when this is a valid registration. More particularly, at block 1040, if the sequence number in the registration request is greater than or equal to the sequence number in the mobility binding table, the registration is valid. Thus, the mobility binding table is updated at block 1042 with the care-of address and the sequence number from the registration request. The sequence number is then provided in a registration reply and the registration reply accepting registration is sent at block 1044. If the sequence number in the request is determined at block 1040 to be less than the sequence number in the mobility binding table, a registration reply denying registration is sent at block 1046.

When a subsequent registration of a node is being performed, there should be an entry in the mobility binding table for the node unless the entry has been intentionally or unintentionally removed as described above (e.g., rebooting of Home Agent). When there is determined to be no binding entry for the node at block 1025, the appropriate binding entry is created. More particularly, the registration flag is set to FALSE at block 1048 to indicate that this is a subsequent registration of the node. The sequence number from the registration request is obtained at block 1050 and blocks 1020–1024 are performed to update the mobility binding table, compose and sent a registration reply.

As described above with reference to block 912 of FIG. 9, the Foreign Agent updates its registration table with a sequence number when proxy registration is performed. FIG. 11 is a diagram illustrating an exemplary Foreign Agent registration table that may be updated to indicate whether a registration is an initial registration or a re-registration. As shown, each entry identifies a node through specifying a node identifier 1102 such as an IP address. In addition, a Home Agent address 1104 and sequence number 1106 are recorded.

The Home Agent's mobility binding table also preferably identifies a proxy sequence number, as described above. FIG. 12 is a diagram illustrating an exemplary Home Agent mobility binding table that may be updated to indicate whether a registration is an initial registration or a re-registration. As shown, each entry includes a node ID 1202 such as an IP address, a care-of address 1204 and a proxy sequence number 1206.

It is important to note that each AAA server may provide conventional authentication and accounting services as well as authorization services. RADIUS and TACACS+ conventionally provide authentication, authorization, and accounting services. Thus, these protocols are well suited for the servers of the present invention. However, the invention is not limited to these protocols. Other authentication, authorization, and accounting protocols may be used.

In accordance with one embodiment, when the Foreign Agent receives the registration request, the Foreign Agent adds the CHAP-Challenge (Type, Length, String) and CHAP-Password (Type, Length, ID, String) in the registration request. The CHAP-Challenge and CHAP-Password may be contained in one or more extensions. When the Home Agent receives the registration request, it creates an access-request from this CHAP information to send to the Home AAA server. The Home AAA server then authenticates the RADIUS access-request from the Home Agent. Thus, the CHAP extension(s) enable the Home AAA server to authenticate the user (e.g., Network Access Identifier) using standards based authentication.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (Home Agent or Foreign Agent) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Generally, the registration technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the registration systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 13:
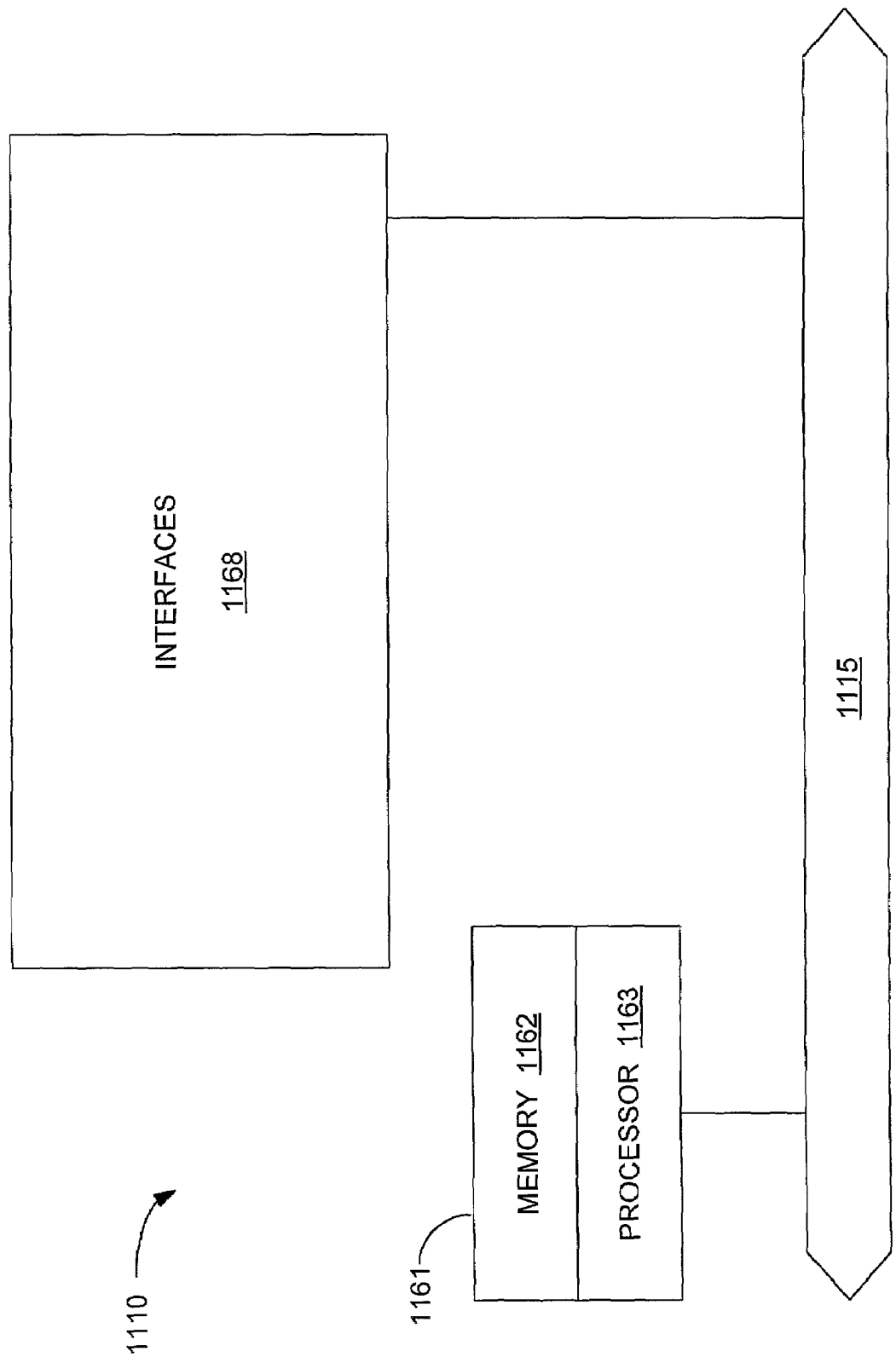
FIG. 13 is a block diagram of a network device that may be configured to implement aspects of the present invention.

Referring now to FIG. 13, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 13 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for registration and routing functions described herein. The program instructions may control the operation of an operating system and/or one or more applications, for example. The memory or memories may also be configured to store tables such as mobility binding and registration tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. In a Foreign Agent supporting Mobile IP, a method of sending a registration request packet on behalf of a node that supports PPP but does not support Mobile IP, comprising:
   accepting a call from the node;
   receiving authentication information associated with a PPP authentication protocol from the node, the authentication information enabling a PPP node to be authenticated;
   obtaining a PPP node profile associated with the authentication information, the PPP node profile including registration information associated with the node that enables proxy registration to be performed by the Foreign Agent on behalf of the node, the registration information associated with the node identifying a Home Agent associated with the node, the PPP node profile further identifying a key to be shared between the Home Agent and the Foreign Agent for use in authenticating communications between the Home Agent and the Foreign Agent and indicating a registration lifetime for the node;
   composing a registration request packet including the registration information associated with the node; and
   sending the registration request packet to the Home Agent on behalf of the node.

2. The method as recited in claim 1, wherein the authentication information includes a user ID submitted by the node during PPP authentication.

3. The method as recited in claim 1, wherein the authentication information includes a password submitted by the node during PPP authentication.

4. The method as recited in claim 1, wherein the PPP authentication protocol is PAP or CHAP.

5. The method as recited in claim 1, wherein the registration request packet includes an extension including the authentication information.

6. The method as recited in claim 1, wherein obtaining a PPP node profile comprises:
   composing a request packet for the node, the request packet including the authentication information;
   sending the request packet to a server, the server being adapted for performing authentication and for storing a profile for one or more nodes supporting PPP, the server being located outside the home network, wherein the server is in a network in which the Foreign Agent is located; and
   receiving a reply packet from the server, the reply packet including at least a portion of a profile for the node.

7. The method as recited in claim 6, wherein the server is a TACACS+ or a RADIUS server.

8. The method as recited in claim 6, wherein the server is coupled to the Foreign Agent.

9. The method as recited in claim 6, wherein the server is coupled to a Home Agent associated with the node.

10. The method as recited in claim 1, the PPP node profile associated with the node further identifying a service selection, the service selection indicating that PPP service is normal PPP service, mobile IP service, or proxy mobile IP service.

11. The method as recited in claim 10, wherein composing the registration request packet is performed in response to obtaining the PPP node profile in which the service selection indicates that PPP service is proxy mobile IP service.

12. The method as recited in claim 1, the PPP node profile associated with the node further identifying a Home Address for the node.

13. The method as recited in claim 12, further comprising:
    completing IPCP to establish and configure IP between the node and the Foreign Agent using the Home Address.

14. The method as recited in claim 1, further comprising:
    receiving a registration reply from the Home Agent, the registration reply identifying a Home Address for the node.

15. The method as recited in claim 14, further comprising:
    completing IPCP to establish and configure IP between the node and the Foreign Agent using the Home Address.

16. The method as recited in claim 1, further comprising:
    receiving a registration reply from the Home Agent, the registration reply including a proxy Mobile Node registration sequence number extension indicating a sequence number for a registration being performed on behalf of the node by the Foreign Agent, the sequence number indicating an order of the registration within a sequence of one or more registrations performed by one or more Foreign Agents on behalf of the node.

17. The method as recited in claim 16, further comprising:
    updating a registration table to associate the sequence number with the node.

18. The method as recited in claim 1, further comprising:
    receiving a registration reply from the Home Agent, the registration reply including a proxy Mobile Node extension indicating whether a registration being performed on behalf of the node is a re-registration by the Foreign Agent or an initial registration by the Foreign Agent.

19. The method as recited in claim 18, further comprising:
    updating a registration table to indicate whether the registration being performed on behalf of the node is a re-registration by the Foreign Agent or an initial registration by the Foreign Agent.

20. The method as recited in claim 1, further comprising:
    providing a sequence number in a proxy Mobile Node extension to the registration request, the sequence number indicating a registration being performed by the Foreign Agent on behalf of the node among a sequence of one or more registrations performed on behalf of the node.

21. The method as recited in claim 20, further comprising:
receiving a registration reply from the Home Agent, the registration reply including a proxy Mobile Node registration sequence number extension indicating an updated sequence number for the registration being performed by the Foreign Agent on behalf of the node.

22. The method as recited in claim 20, wherein the sequence number is zero when the registration is an initial registration being performed on behalf of the node.

23. The method as recited in claim 20, further comprising:
obtaining the sequence number from a registration table, the registration table identifying the node, a Home Agent associated with the node, and the sequence number.

24. A computer-readable medium adapted for sending a registration request packet on behalf of a node that supports PPP but does not support Mobile IP, comprising:
instructions for accepting a call from the node;
instructions for receiving authentication information associated with a PPP authentication protocol from the node, the authentication information enabling a PPP node to be authenticated;
instructions for obtaining a PPP node profile associated with the authentication information, the PPP node profile including registration information associated with the node that enables proxy registration to be performed by the Foreign Agent on behalf of the node, the registration information associated with the node identifying a Home Agent associated with the node, the PPP node profile further identifying a key to be shared between the Home Agent and the Foreign Agent for use in authenticating communications between the Home Agent and the Foreign Agent and indicating a registration lifetime for the node;
instructions for composing a registration request packet including the registration information associated with the node; and
instructions for sending the registration request packet to the Home Agent on behalf of the node.

25. An apparatus for sending a registration request packet on behalf of a node that supports PPP but does not support Mobile IP, comprising:
a processor; and
a memory, at least one of the processor and the memory being adapted for:
accepting a call from the node;
receiving authentication information associated with a PPP authentication protocol from the node, the authentication information enabling a PPP node to be authenticated;
obtaining a PPP node profile associated with the authentication information, the PPP node profile including registration information associated with the node that enables proxy registration to be performed by the Foreign Agent on behalf of the node, the registration information associated with the node identifying a Home Agent associated with the node, the PPP node profile further identifying a key to be shared between the Home Agent and the Foreign Agent for use in authenticating communications between the Home Agent and the Foreign Agent and indicating a registration lifetime for the node;
composing a registration request packet including the registration information associated with the node; and
sending the registration request packet to the Home Agent on behalf of the node.

26. A Foreign Agent supporting Mobile IP, the Foreign Agent being adapted for sending a registration request packet on behalf of a node that supports PPP but does not support Mobile IP, comprising:
means for accepting a call from the node;
means for receiving authentication information associated with a PPP authentication protocol from the node, the authentication information enabling a PPP node to be authenticated;
means for obtaining a PPP node profile associated with the authentication information, the PPP node profile including registration information associated with the node that enables proxy registration to be performed by the Foreign Agent on behalf of the node, the registration information associated with the node identifying a Home Agent associated with the node, the PPP node profile further identifying a key to be shared between the Home Agent and the Foreign Agent for use in authenticating communications between the Home Agent and the Foreign Agent and indicating a registration lifetime for the node;
means for composing a registration request packet including the registration information associated with the node; and
means for sending the registration request packet to the Home Agent on behalf of the node.

27. The apparatus as recited in claim 25, wherein the authentication information includes a user ID submitted by the node during PPP authentication.

28. The apparatus as recited in claim 25, wherein the authentication information includes a password submitted by the node during PPP authentication.

29. The apparatus as recited in claim 25, wherein the PPP authentication protocol is PAP or CHAP.

30. The apparatus as recited in claim 25, wherein the registration request packet includes an extension including the authentication information.

31. The apparatus as recited in claim 25, wherein obtaining a PPP node profile comprises:
composing a request packet for the node, the request packet including the authentication information;
sending the request packet to a server, the server being adapted for performing authentication and for storing a profile for one or more nodes supporting PPP, the server being located outside the home network, wherein the server is in a network in which the apparatus is located; and
receiving a reply packet from the server, the reply packet including at least a portion of a profile for the node.

32. The apparatus as recited in claim 31, wherein the server is a TACACS+ or a RADIUS server.

33. The apparatus as recited in claim 31, wherein the apparatus is a Foreign Agent and the server is coupled to the Foreign Agent.

34. The apparatus as recited in claim 31, wherein the server is coupled to a Home Agent associated with the node.

35. The apparatus as recited in claim 25, the PPP node profile associated with the node further identifying a service selection, the service selection indicating that PPP service is normal PPP service, mobile IP service, or proxy mobile IP service.

36. The apparatus as recited in claim 35, wherein composing the registration request packet is performed in response to obtaining the PPP node profile in which the service selection indicates that PPP service is proxy mobile IP service.

37. The apparatus as recited in claim 35, the PPP node profile associated with the node further identifying a Home Address for the node.

38. The apparatus as recited in claim 37, further comprising:
   completing IPCP to establish and configure IP between the node and the apparatus using the Home Address.

39. The apparatus as recited in claim 35, further comprising:
   receiving a registration reply from the Home Agent, the registration reply identifying a Home Address for the node.

40. The apparatus as recited in claim 39, further comprising:
   completing IPCP to establish and configure IP between the node and the apparatus using the Home Address.

41. The apparatus as recited in claim 25, further comprising:
   receiving a registration reply from the Home Agent, the registration reply including a proxy Mobile Node registration sequence number extension indicating a sequence number for a registration being performed on behalf of the node by the apparatus, the sequence number indicating an order of the registration within a sequence of one or more registrations performed by one or more apparatuses on behalf of the node.

42. The apparatus as recited in claim 41, further comprising:
   updating a registration table to associate the sequence number with the node.

43. The apparatus as recited in claim 25, further comprising:
   receiving a registration reply from the Home Agent, the registration reply including a proxy Mobile Node extension indicating whether a registration being performed on behalf of the node is a re-registration by the apparatus or an initial registration by the apparatus.

44. The apparatus as recited in claim 43, further comprising:
   updating a registration table to indicate whether the registration being performed on behalf of the node is a re-registration by the apparatus or an initial registration by the apparatus.

45. The apparatus as recited in claim 25, further comprising:
   providing a sequence number in a proxy Mobile Node extension to the registration request, the sequence number indicating a registration being performed by the apparatus on behalf of the node among a sequence of one or more registrations performed on behalf of the node.

46. The apparatus as recited in claim 45, further comprising:
   receiving a registration reply from the Home Agent, the registration reply including a proxy Mobile Node registration sequence number extension indicating an updated sequence number for the registration being performed by the apparatus on behalf of the node.

47. The apparatus as recited in claim 45, wherein the sequence number is zero when the registration is an initial registration being performed on behalf of the node.

48. The apparatus as recited in claim 45, further comprising:
   obtaining the sequence number from a registration table, the registration table identifying the node, a Home Agent associated with the node, and the sequence number.

\* \* \* \* \*